United States Patent [19]

Carls

[11] Patent Number: 6,022,111

[45] Date of Patent: Feb. 8, 2000

[54] SELF-PROTECTED IMAGEABLE PRESENTATION TRANSPARENCY ASSEMBLY

[75] Inventor: Joseph C. Carls, Austin, Tex.

[73] Assignee: 3M Innovative Properties Company, St. Paul, Minn.

[21] Appl. No.: 08/995,324

[22] Filed: Dec. 22, 1997

[51] Int. Cl.[7] .................................................. G03B 21/11
[52] U.S. Cl. ................................. 353/120; 353/DIG. 5; 40/701; 40/771
[58] Field of Search ..................... 353/120, 97, DIG. 5, 353/DIG. 3; 40/701, 705, 771, 772, 774, 776

[56] References Cited

U.S. PATENT DOCUMENTS

| 3,253,358 | 5/1966 | Wright ..................................... 40/106.1 |
| 3,264,936 | 8/1966 | Schultz et al. .............................. 88/24 |
| 3,438,702 | 4/1969 | Milhaupt et al. ......................... 353/35 |
| 3,438,703 | 4/1969 | Winnemann ............................ 353/120 |
| 3,524,703 | 8/1970 | Wright ..................................... 353/35 |
| 3,536,393 | 10/1970 | Kitch ...................................... 353/120 |
| 3,537,792 | 11/1970 | Furniss et al. .......................... 353/120 |
| 3,544,211 | 12/1970 | Albee, Jr. ................................ 353/120 |
| 3,600,079 | 8/1971 | Smith, Jr. et al. ...................... 353/120 |
| 3,875,693 | 4/1975 | Pelkey .................................... 40/124.1 |
| 4,402,585 | 9/1983 | Gardlund ................................ 353/120 |
| 4,679,923 | 7/1987 | Nielsen ................................... 353/120 |
| 4,810,544 | 3/1989 | Hickman ................................. 428/40 |
| 4,873,135 | 10/1989 | Wittnebel et al. ...................... 428/192 |
| 4,925,720 | 5/1990 | Hansen . | |
| 5,237,355 | 8/1993 | Kiehne et al. ........................... 353/120 |
| 5,266,987 | 11/1993 | Kiehne et al. ....................... 353/DIG. 5 |
| 5,283,092 | 2/1994 | Everaerts et al. ........................ 428/40 |
| 5,319,400 | 6/1994 | Herbert et al. .......................... 353/120 |
| 5,329,324 | 7/1994 | Candido ............................ 353/DIG. 5 |
| 5,330,824 | 7/1994 | Takimoto et al. ....................... 428/201 |
| 5,335,027 | 8/1994 | Lin et al. ................................. 353/120 |
| 5,371,560 | 12/1994 | Kiehne et al. ........................... 353/120 |
| 5,568,210 | 10/1996 | Kiehne et al. ........................... 353/120 |
| 5,622,420 | 4/1997 | Bengtsson .............................. 353/120 |
| 5,669,689 | 9/1997 | Zeifang ............................. 353/DIG. 3 |

FOREIGN PATENT DOCUMENTS 382266 of 0000 Sweden .

Primary Examiner—William Dowling
Attorney, Agent, or Firm—Nestor F. Ho

[57] ABSTRACT

A transparency assembly including two generally transparent sheets, a transparent imageable sheet and a transparent protective sheet. The imageable sheet has a first major surface, a second major surface, and a plurality of side edges. The protective sheet is hingedly coupled to the imageable sheet by a full rotation hinge. The protective sheet has a first folded position where the protective sheet overlays at least a portion of the first major surface of the imageable sheet and a second folded position where the protective sheet overlays at least a portion of the second major surface of the imageable sheet. One or more flaps hingedly couple to one of the transparent sheets. The flap has a folded position and an unfolded position. In the folded position, the flap overlays at least a portion of the imageable sheet. In the unfolded position, the flap extends generally coplanarly alongside the imageable sheet.

14 Claims, 11 Drawing Sheets

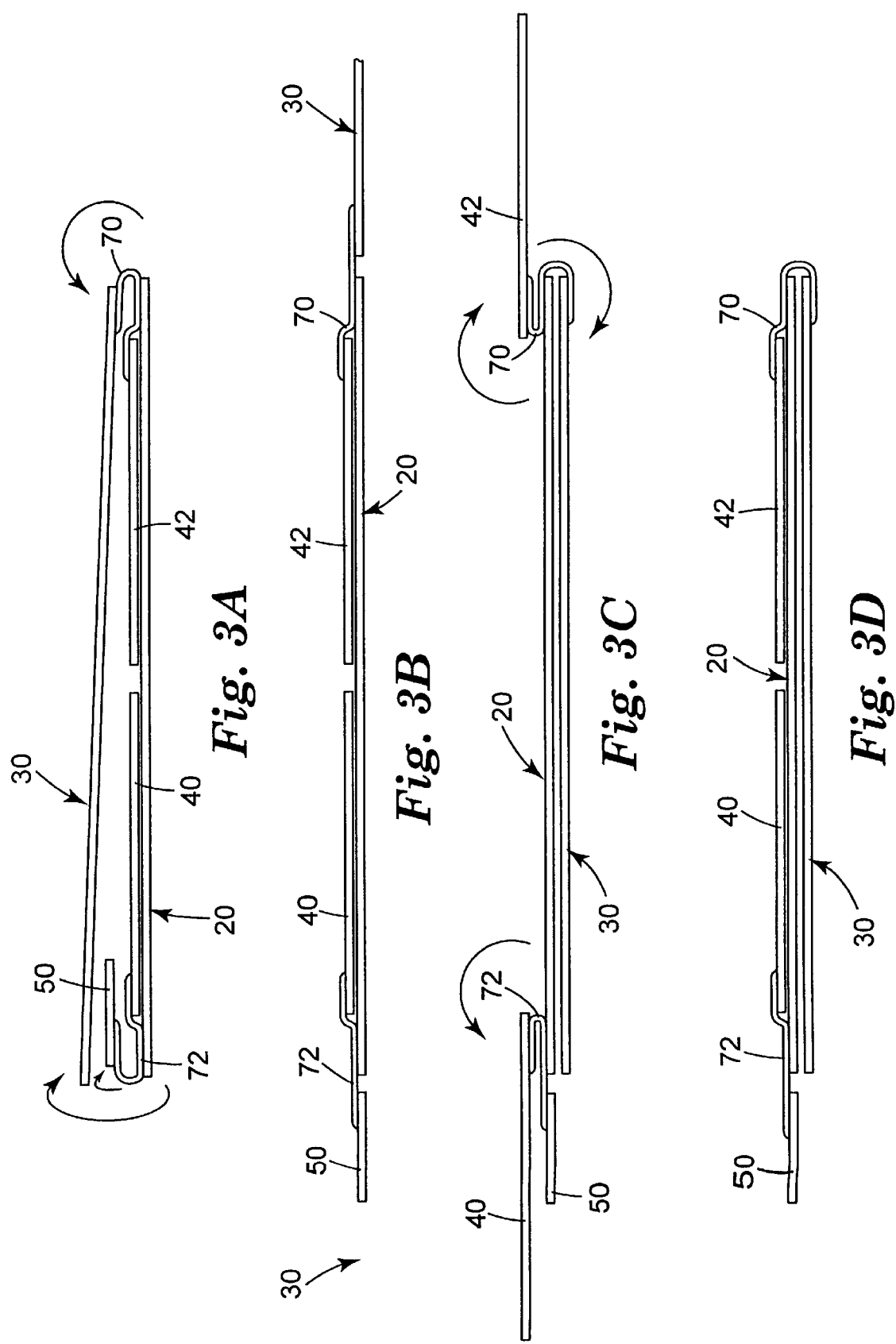

SELF-PROTECTED IMAGEABLE PRESENTATION TRANSPARENCY ASSEMBLY

FIELD OF THE INVENTION

The present invention relates generally to transparency films and to the protection, presentation, and storage of such films. More specifically, the present invention relates to a transparency assembly having built-in image protection, peripheral lighting control, preview, and annotation features. The transparency assembly of the present invention may be used in conjunction with common printing devices, such as inkjet, solid inkjet, thermal transfer, ink pen or electrographic printing processes.

BACKGROUND OF THE INVENTION

The use and display of graphics and text in business presentations, lectures and the like often augments the effectiveness of the speaker and of the presentation. Transparencies, bearing graphics and/or text, are often exhibited to the viewers on a screen using an overhead projector. Transparencies allow the presenter to preview the presentation, easily sort through materials, point out specific features, and easily add additional comments or graphics. Newer transparency designs offer compatibility with printing devices, and thus may be printed without the need of specialized equipment..

However, individual transparencies are delicate. The transparent film, coatings and inks may be easily damaged in storage or transit. Also, dirt and dust may deposit over the image. Any blemishes to the image are, by the very nature of the medium, amplified and highlighted during a presentation.

Traditional transparencies also present some other difficulties. Transparencies, given their usual manufacture based on a plastic film, do not readily accept notes made by the presenter in pencil or pen, thus making it difficult for the presenter to record private annotations regarding the image. During presentations, illumination gaps form about the periphery of the transparency. These illumination gaps may be distracting to the viewers and diminish the professional appearance of a presentation. Finally, transparency sheets lack storage and organization features.

Different types of covers, folders, and envelopes have been provided in order to enable professional presentations, as well as to provide interim protection of transparencies and images. Frames made from carton, paperboard and the like have been discussed. The frame is meant to mask the illumination gaps formed about the periphery of the transparency proper. The frame also may be used to make notes or other memoranda needed by the lecturer which remain unseen by the audience. However, these frames are bulky and do not fit into standard size files, binders and shelves, being therefore difficult to store and transport. Also, they are not easily removable without destruction of the frame and damage to the transparency. Finally, the frames are not convenient to attach to transparencies as each one is carefully positioned and attached by hand.

Other references discuss the use of an envelope or sleeve to protect and store the transparency sheets. For example, an envelope comprising a plastic sheet pocket having punched holes along one side, and being open at the top for insertion of the transparency to be presented has been discussed. These envelopes are removable, relatively simple to handle, store and transport as the envelopes have outer dimensions similar to those of standard binders or files. The transparency is protected by the envelope and at the presentation, notes can be made on the envelope.

Another existing transparent sleeve comprises a transparent sheet material having a single fold dividing the sheet into two halves, and a strip of double coated adhesive tape running the length of an edge of the sheet substantially parallel to the fold. Yet another envelope for overhead transparencies comprises a rectangular pocket formed of transparent sheet material defining opposed rectangular faces which are separable along at least one side edge for insertion of the transparency.

Some other existing covers and envelopes are considered complicated or difficult to handle. The covers of most of these transparencies are difficult to remove. In addition, many of the existing references presuppose that the transparencies are to be presented in a prescribed order.

However, the envelopes also significantly increase the weight that a presenter must carry. Peripheral illumination is not masked and the lecturer cannot make written notes on the envelopes without having these notes being shown on the screen as well. The punched holes also show an outline on the screen affecting the appearance of the presentation.

The transparencies are loaded manually into the protective sleeves, a time-consuming procedure for large presentations. Transparency sleeves also may suffer from "oil-pooling" effects, that is, when the silicone oil present on the film after fusing in some printers wets the envelope and forms a visible ring that affects the quality of the image.

Several attempts have been made to improve the performance of the transparencies themselves. An imageable film, suitable for use in an ink jet printer or a copier, having perforation and flaps has been discussed. However, the film may still be damaged during storage and transport. The need remains for a structure that offers protection to the image, ease of use, storage and portability and that allows for professional looking presentations.

SUMMARY OF THE INVENTION

The present invention describes a transparency assembly including two sheets, a generally transparent imageable sheet and a protective sheet. The imageable sheet has a first major surface, a second major surface, and a plurality of side edges. The protective sheet is hingedly coupled to the imageable sheet by a full rotation hinge. The protective sheet may be generally transparent and has a first folded position where the protective sheet overlays at least a portion of the first major surface of the imageable sheet and a second folded position where the protective sheet overlays at least a portion of the second major surface of the imageable sheet.

The transparent imageable sheet includes a sheet of transparency film having two major surfaces and an imaging coating, such as an ink receptive coating, covering at least a portion of one of the major surfaces of the sheet of transparency film and defining an imaging area. The imageable sheet is imageable by an ink-jet, solid inkjet or electrophotographic printing process. The entire assembly includes an imaging mode where the protective sheet and the imageable sheet "sandwich" the transparency assembly to allow passage of the assembly through the printing processes.

One or more flaps hingedly couple to one of the sheets. The flap has a folded position and an unfolded position. In the folded position, the flap overlays at least a portion of the imageable sheet. The flap is spaced from one of the side edges of the imageable sheet, and where in the unfolded position the flap covers said side edge and in the folded position said flap exposes said side edge. The flap may be opaque, colored, frosted, or patterned and may comprise a material suitable for receiving annotations.

A storage strip may be coupled proximally to a side edge of the imageable sheet. In the unfolded position, the flap covers the storage strip and in the folded position said flap exposes said storage strip. The storage strip may be coupled to one of the sheets or to an outer surface of the full rotation hinge, such that in the second folded position of the transparent protective sheet the storage strip is pleated under said protective sheet.

BRIEF DESCRIPTION OF THE DRAWINGS

FIGS. 3A–3D is a front elevation view of an alternative transparency assembly in accordance with the present invention including an alternative hinge design.

DETAILED DESCRIPTION OF THE INVENTION

Figure 1:
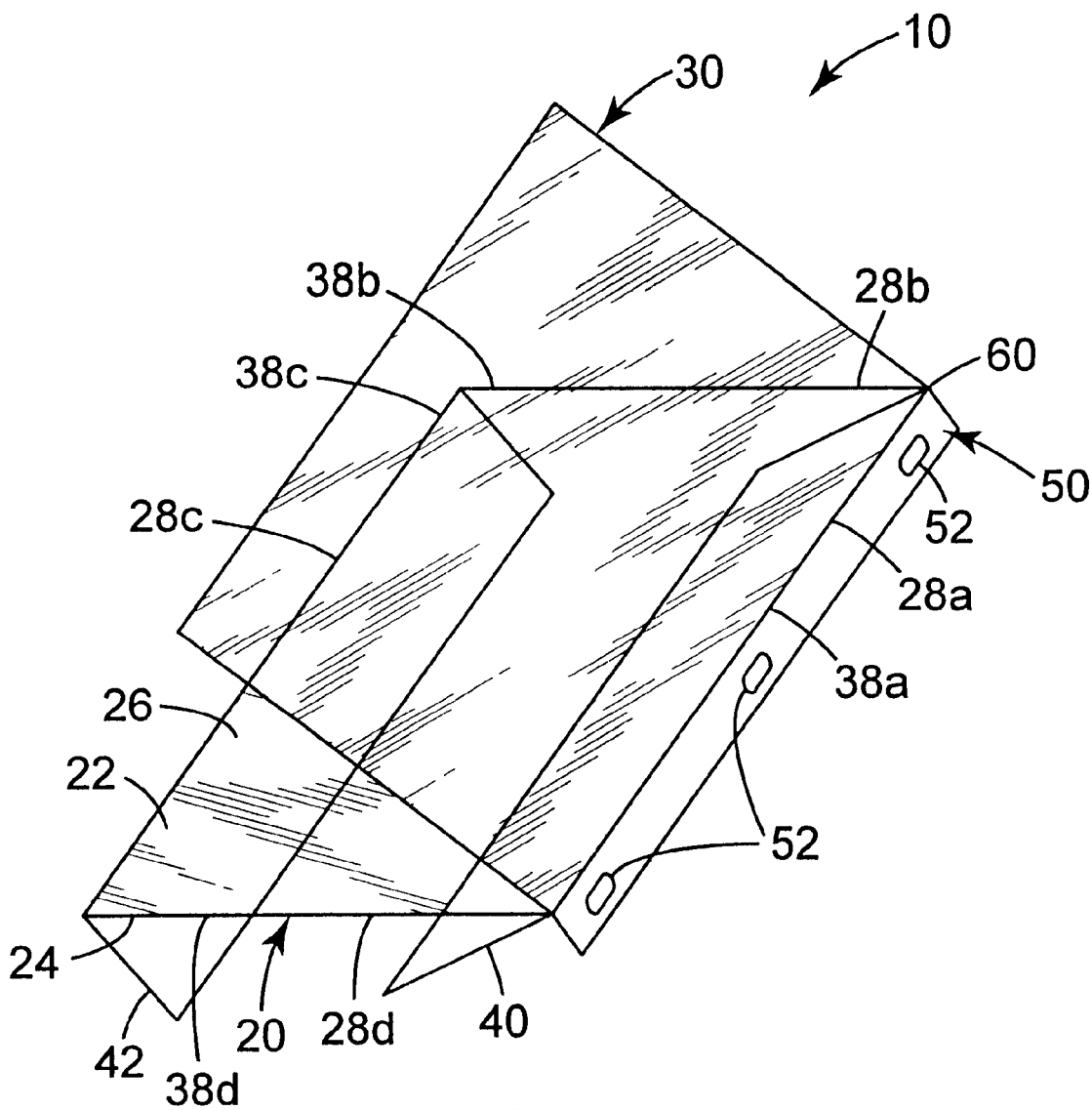
FIG. 1 is a perspective top view of a transparency assembly in accordance with the present invention.

An exemplary embodiment of a transparency assembly 10 in accordance with the present invention is illustrated in FIGS. 1–9. The figures are not to scale. To aid in the understanding of the present invention, proportions in some figures, including specifically the thickness of the various elements of the transparency assemblies, have been exaggerated. The transparency assembly 10 includes an imageable sheet 20, a protective sheet 30, and two presentation flaps 40 and 42. The transparency assembly 10 also includes a storage strip 50.

The imageable sheet 20 includes a generally rectangular sheet of a transparent material or film 21 (see FIGS. 5, 7 and 9) having a first major surface 22 and a second major surface 24. An imaging coating 25 covers at least a portion of the first major surface 22 of the sheet of transparent material 21 and defines an imaging area 26. The imaging coating 25 is capable of accepting an image, for example, from an inkjet or electrographic printer. In the present embodiment, the imaging coating is an ink receptive coating such as methyl methacylate. The term ink-receptive is intended to mean a material capable of accepting liquid and solid inks, toner, and/or thermal transfer pigments. Those skilled in the art will recognize that other coatings such as gelatin and polyvinyl alcohol may be utilized. In alternative embodiments, the imageable sheet may comprise an imageable material that does not require a coating, such as polyesters, acrylics and polyvinyl pyrrollidone.

The terms overlay or cover are relative terms and are intended to mean a generally parallel, but not necessarily contiguous, juxtaposition, whether that is above or below in relation to the "vertical" axis defined by the beam of light emitted by the projector. It should be understood that the relative position of the elements of the present transparency assembly along the vertical axis may be changed without departing from the spirit of the present invention.

The imageable sheet 20 includes four side edges 28a–d, better appreciated in FIG. 1. The imageable sheet 20 has two longitudinal side edges 28a and 28c and two lateral side edges 28b and 28d. In the illustrated embodiment, the imageable sheet 20 and the protective sheet 30 are rectangular and measure approximately 8½ inches by 11 inches (21.59×27.94 cms.). Other embodiments may be designed in different sizes and shapes.

The exemplary imageable sheet 20 is preferably transparent and colorless, but may be colored or patterned. Different colors, backgrounds or patterns may be used, for example, to identify different users, to provide a background for a presentation, to introduce logos, or legends, or merely for aesthetic reasons. Color may be introduced through printing, coding, or as part of the film making process. The transparency imageable sheets also may have borders such as a thin line or a white strip, coextensive or proximal to the side edges. An edge may be printed directly onto the transparent sheet or may be a separate element coupled by fasteners, adhesive, or other attachment methods known in the art. The transparency imageable sheets may be made from transparent polymeric sheet materials such as cellulose esters, polyesters—such as polyethylene terephthalate, polyamides, such as nylon, polyolefins such as polyethylene and polypropylene, polycarbonites, polyethers and polyvinyls, such as polyvinyl chloride. The illustrated exemplary embodiment includes a 60 μm thick sheet of polyethylene terephthalate polyester.

The protective sheet 30 includes a transparent film of similar dimensions to those of the imageable sheet or the imaging area, so that when placed over the imageable sheet, the protective sheet substantially covers all the imaged portion thereof The protective sheet 30 is a rectangular sheet of a transparent material, such as 60 μm thick polypropylene or polyester. Again, those skilled in the art will recognize that other sizes, shapes, materials, different degrees of opacity, colors, sizes and shapes are possible. The protective sheet 30 has a plurality of side edges 38a–d. In the transparency assembly 10, the protective sheet 30 has two opposite longitudinal side edges 38a and 38c and two opposite lateral side edges 38b and 38d.

The material composition of the protective sheet 30 is selected to be able to withstand forces or conditions imposed by the components of imaging devices, such as for example, pressure rollers, heat rollers, drive rollers and belts, user systems or drying systems, separators, guidance members and the like. Considerations such as compatibility with adhesion or welding methods used to adhere the various components of the transparency assemblies also are considered during material selection. Transparent polymeric sheet materials such as cellulose esters, polyesters—such as polyethylene terephthalate, polyamides, such as nylon, polyolefins such as polyethylene and polypropylene, polycarbonites, polyethers and polyvinyls, such as polyvinyl chloride, may be used in the manufacture of the protective sheet 30. Again, the protective sheet may include colors, backgrounds or patterns. In alternative embodiments, the protective sheet may even be comprised of opaque or translucent materials, such as paper, cardstock, or vinyl.

Exposed surfaces of the protective sheet 30 may be coated, such as with some form of lubricant known in the art such as silicone, to provide suitable feeding characteristics, specifically relating to the resistivity of the surface and smoothness of the surfaces. Also, relatively large particulates may be incorporated into the surface. The particles tend to "offset" the protective sheet 30 from direct contact with the imageable sheet 20 to alleviate potential oil pooling and blocking of the images.

The protective sheet 30 includes a full rotation hinge assembly 60, better seen in FIGS. 2A–2D, 3A–3D, and FIG. 4. The full rotation hinge assembly 60 hingedly couples the protective sheet 30 to the imageable sheet 20 generally along the longitudinal side edges 28a and 38a. A full rotation hinge, or 360° hinge, is a hinge that allows for full rotational movement about an axis generally disposed at the longitudinal edge 28a. A 360° hinge may include, for example, two coupled 180° hinges. The hinge 60 is a flat hinge that allows the protective sheet 30 to remain in a first or second folded position without bulging and without a tendency to curl.

The hinge assembly 60 of the present invention includes a longitudinal strip of a flexible material 64, such as a Teijin backing tape, adhesively attached by a permanent hot-melt adhesive placed on one side of the tape to side edge regions 62 and 63 of the imageable sheet 20 and of the protective sheet 30 respectively. The tape also may use a pressure sensitive adhesive or other suitable adhesives or attachment means known in the art. An alternative embodiment uses a heat-resistant polyester tape having a thickness of less than 0.5 mil, 13 microns or less, with a particularly preferred thickness of less than 0.42 mil gage. Other alternative embodiments may use other tape strip materials know in the art, such as polypropylene, having the desired flexibility and resistance to printing process conditions at a variety of different thicknesses. Those skilled in the art will recognize that a variety of different hinge designs, using attachment means such as adhesives, thermal welds or folds, may be utilized to achieve the full rotation effect.

The transparency assembly 10 further includes the first and the second presentation flaps or framing strips 40 and 42 generally coupled proximal to the longitudinal side edges 28a and 28c of the imageable sheet 20. Other transparency assembly embodiments may include only one flap attached to either a longitudinal or a lateral side edge. In the present embodiment, the flaps 40 and 42 are rectangular, measure approximately 8.5×1.75 inches (21.59×4.44 cms.), and are made of an ink-receiving opaque material, such as paper or light-weight cardboard stock, that is suitable for receiving annotations made by the presenter in pen or pencil and that block at least a portion of the light from a projector. In alternative embodiments, the flaps may comprise other opaque, transparent or translucent materials. The flap or flaps may be patterned, colored, or frosted or contain text or graphics, to identify or organize a presentation or for aesthetic reasons. The flaps also may be transparent and include legends or logos. In other embodiments, the flaps may include portions of opaque and of transparent materials combined together to create a desired illumination pattern. Yet other embodiments may include one-way transmission flaps, polarized flaps, and flaps that absorb certain wavelengths of radiation, but which transmit, without scatter, other radiation wavelengths.

The flaps or framing strips 40 may be sized to abut, overlap or cover the entire back of the imaging sheet when in the folded position. The use of full coverage flaps allows the image to be previewed against an opaque background.

The flaps 40 and 42 each are coupled generally about the longitudinal side edges 28a and 28C of the imageable sheet 20 by hinges 66 and 68. In the present embodiment, the hinges 66 and 68, as illustrated in FIGS. 2A–2D, include longitudinal strips of an adhesive flexible tape coupled to the flaps 40 and 42 and to side edge regions of the imageable sheet.

The hinge 66 also couples the storage strip 50 to the imageable sheet 20. The storage strip 50 comprises a strip of plastic, paper, cardboard, or other suitable material coupled proximal to one of the longitudinal side edges 28a of the imageable sheet 20. The storage strip 50 illustrated in FIGS. 1–9 includes three perforations 52 to allow the storage of the transparency assembly 10 in a binder, file or the like. Other embodiments may include different perforation alignments, binding strips, adhesive strips, or other devices known in the art for aiding in the storage of transparency assemblies. Again, those skilled in the art, will recognize that different possible hinged structures exist, such as those disclosed in U.S. Pat. No. 5,371,560 and No. 5,568,210, hereby included by reference. Other embodiments may include flaps hingedly coupled by other means known in the art, such as foldable welds or flutes. Also, in other embodiments, the flaps 40 alternatively may be coupled to the protective sheet 30 or directly to the hinge 60.

FIGS. 3A–3D illustrate an alternative hinge arrangement for the embodiment of FIG. 1 including only two hinges 70 and 72. The hinges 70 and 72 are longitudinal flexible adhesive tape strips. The hinge 70 couples the presentation flap 42, the imageable sheet 20, and the protective sheet 30. The hinge 72 couples the presentation flap 40, the imageable sheet 20, and the storage strip 50. The material for the hinges, or at least that of hinge 70, is selected to be flexible enough to allow 360° rotation, for example from an imaging position illustrated in FIG. 3A to a storage position illustrated in FIG. 3D.

Figure 2A:
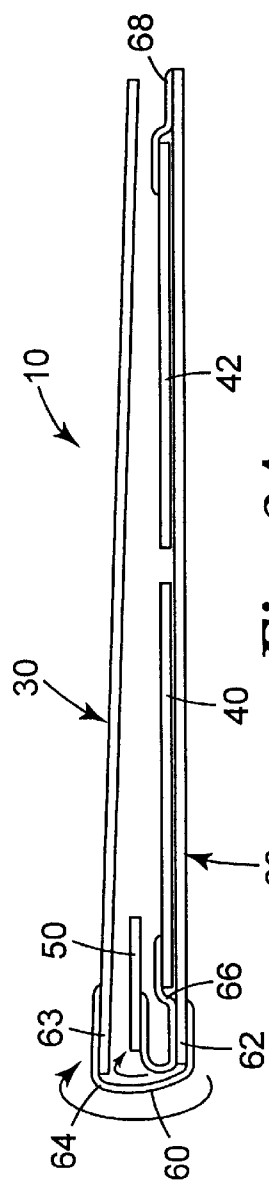
FIGS. 2A–2D is a front elevation view of the transparency assembly illustrated in FIG. 1, including hinge design detail.
Figure 2B:
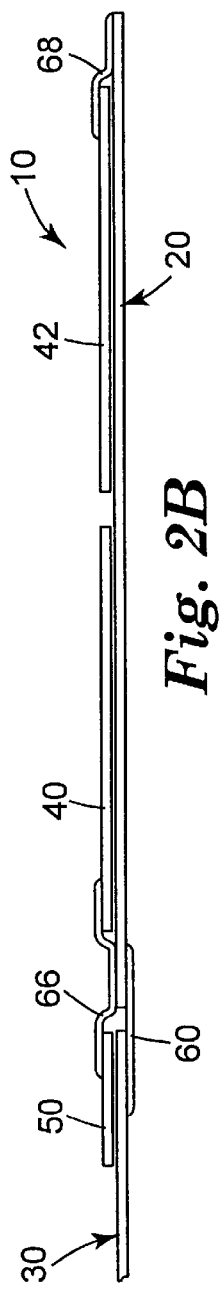
Figure 2C:
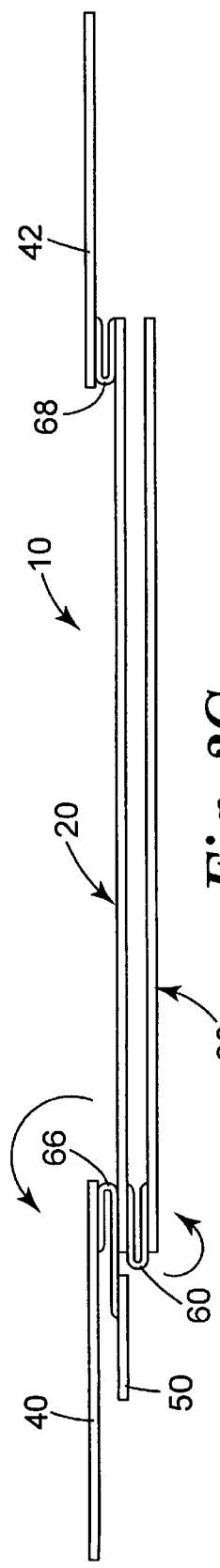
Figure 2D:
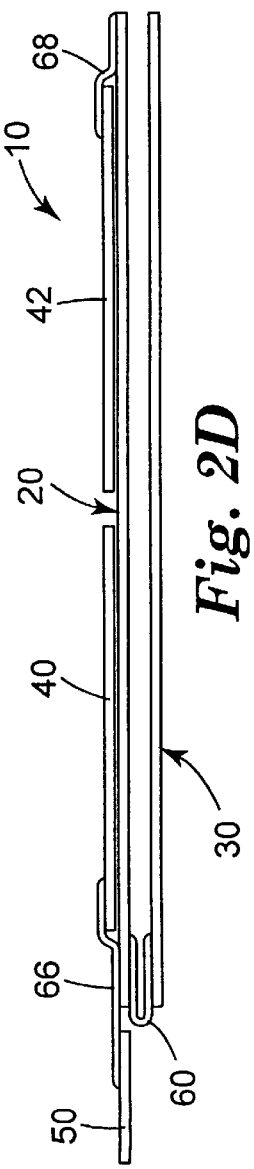
Figure 4:
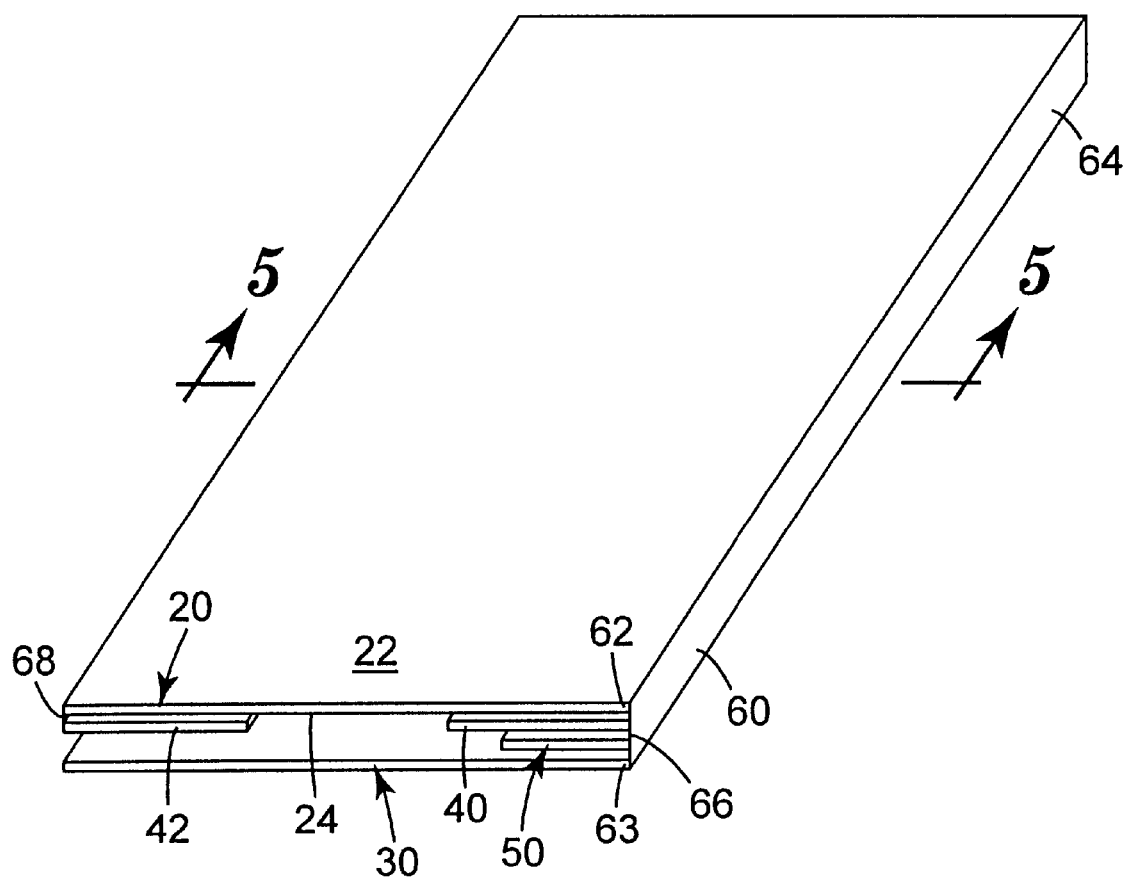
FIG. 4 is a perspective front, top and side view of the transparency assembly illustrated in FIG. 1 in imaging mode.
Figure 5:
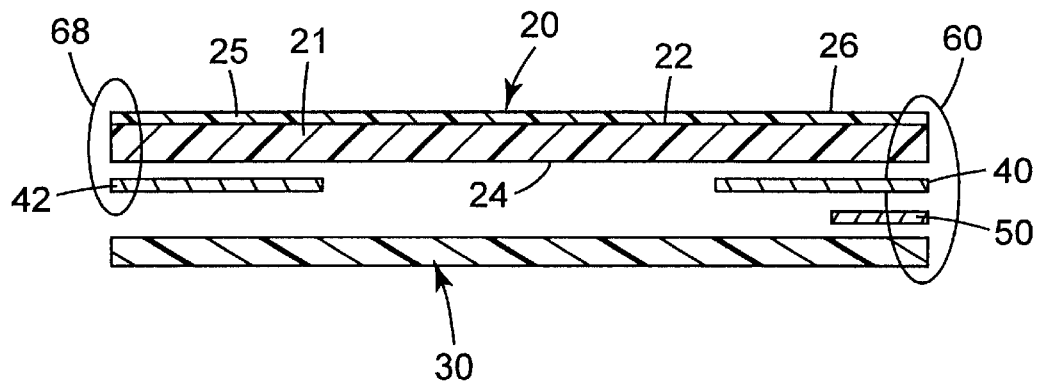
FIG. 5 is a front elevation view of a cross-sectional cut along line 5—5 of the transparency assembly illustrated in FIG. 4 in imaging mode.
Figure 7:
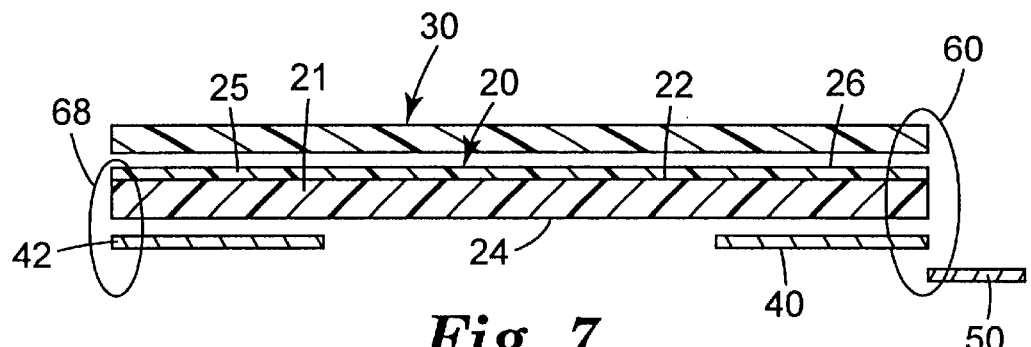
FIG. 7 is a front elevation view of a cross-sectional cut along line 7—7 of the transparency assembly illustrated in FIG. 6 in storage mode.
Figure 9:
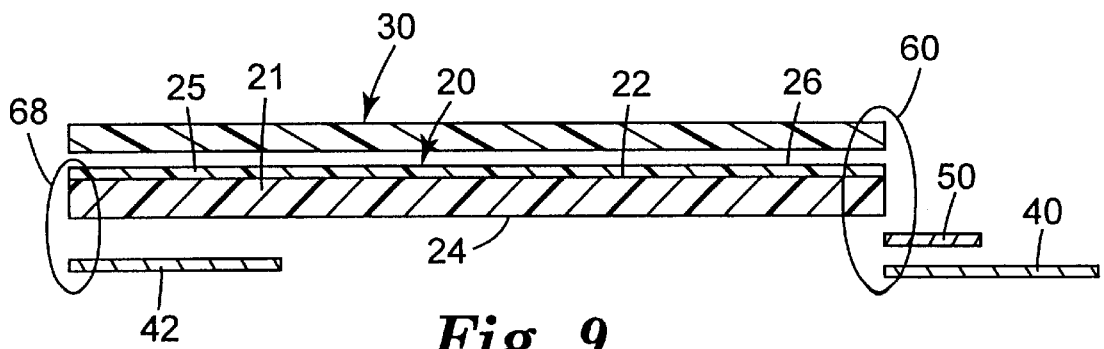
FIG. 9 is a front elevation view of a cross-sectional cut along line 9—9 of the transparency illustrated in FIG. 8 in projection mode.
Figure 6:
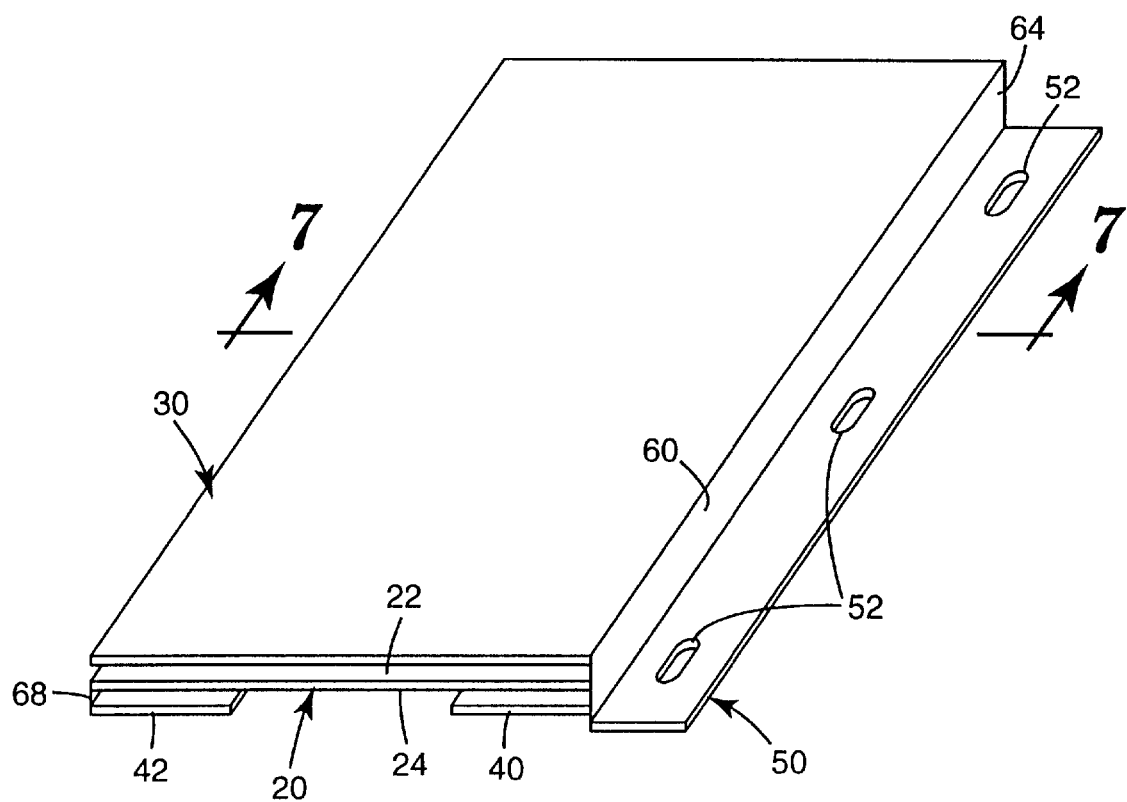
FIG. 6 is a front, top and side perspective view of the transparency assembly illustrated in FIG. 1 in storage mode.
Figure 8:
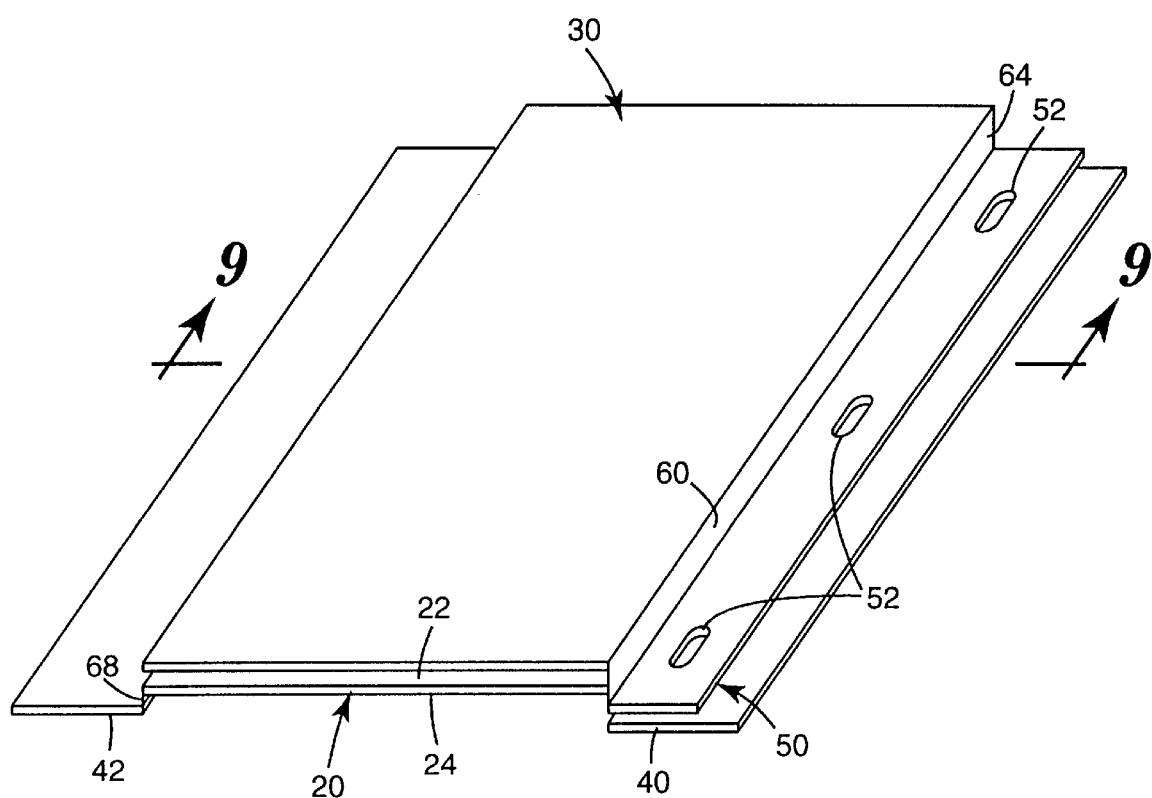
FIG. 8 is a front, top and side perspective view of the transparency assembly illustrated in FIG. 1 in projection mode.

When coupled, the protective sheet 30 has a first-folded position where the protective sheet 30 overlays at least a portion of the first major surface 22 of the imageable sheet 20 as illustrated for example in FIGS. 2C, 2D, 3C, 3D, 6 and 7. The protective sheet 30 also has a second folded position where the protective sheet 30 overlays at least a portion of the second major surface 24 of the imageable sheet 20, as illustrated in FIGS. 2A, 3A and 4.

The flaps 40 and 42 also have a first folded position and a second or unfolded position. In the folded position, illustrated for example in FIGS. 2A, 2B, 2D, 3A, 3B, and 3D, the flaps 40 and 42 overlay at least a portion of the imageable sheet 20 and expose the longitudinal side edges 28a and 28c. In the unfolded position, illustrated for example in FIGS. 2C and 3C, the flaps 40 and 42 are generally unfolded to the sides of the imageable sheet 20. In the transparency assembly 10, the flaps 40 and 42 are slightly spaced from the longitudinal side edges 28a and 28c of the imageable sheet 20, such that in the unfolded position, the flaps 40 and 42 cover the longitudinal side edges 28a and 28c of the imageable sheet 20 as well as the storage strip 50 and "frame" the edges of the projection of the imageable sheet. The frame created by the opaque flaps 40 and 42 in the unfolded position helps block out peripheral light, that is, light about the periphery of the transparency assembly 10. When the transparency assembly 10 having opaque flaps 40 and 42 is placed on the stage of an overhead projector, the opaque flaps 40 and 42 prevent transmission of a majority of the light through the side edges of the projector stage to the screen, thus helping eliminate peripheral illumination gaps and creating professional presentations to the viewer. The opaque flap 40 and 42 scatter light in a way that the majority of the light does not reach the screen, thereby creating a sufficient contrast between the intensity of light coming through a transparency and the lesser intensity of light, if any, coming from the side edges of the stage, thus promoting easier viewing of the projected image. The term opaque is defined in reference to use on an overhead projector. The term opaque is intended to include materials having optical properties that block, reflect or scatter the projected light. For the purpose of this invention an opaque material is defined as having the property of reducing light incident on the overhead screen in regions where the material is employed by a factor of at least 50 percent.

The transparency assembly 10 of the present invention may be disposed by the user in different configurations, also referred to as positions or modes, depending on whether the transparency assembly 10 is being manufactured, imaged, stored, or displayed.

When the transparency assembly 10 is in the imaging (FIGS. 2A, 3A, 4, and 5), manufacturing (FIGS. 2B and 3B), or storage (FIGS. 2D, 3D, 6 and 7) position, the flaps 40 and 42 are placed in the folded position. When the transparency assembly is in a use position (FIGS. 2C, 3C, 8 and 9), the flaps 40 and 42 are unfolded. The flexibility and flat design of hinges 66 and 68 allow the flaps 40 and 42 to stay in the unfolded position during presentation. Otherwise the flaps 40 and 42 might tend to spring back to their folded position, which is inconvenient for the presenter. If a hinge design is selected where the flaps are difficult to fold, the envelope will not lay flat on the stage, which may cause focusing problems, which are especially severe when the presenter uses a reflective type overhead projector. To aid the situation, the envelope can be placed with the flaps 40 and 42 face down on the overhead projector stage, so that the weight of the transparency assembly may aid the flaps to stay unfolded.

In the imaging configuration, illustrated in FIGS. 2A, 3A, 4, and 5, the imaging area 26 of the first surface 22 of the imageable sheet 20 is exposed to accept inks or toners. The second major surface 24 of the imageable sheet is covered or overlaid by the protective sheet 30, which is in the second folded position. The protective sheet 30 protects the flaps 40 which are disposed in their folded position. The storage strip 50 tucks or folds in between the imageable sheet 20 and the protective sheet 30. Together the imageable sheet 20 and the protective sheet 30 "sandwich," that is, form an envelope around, the flaps 40 and 42 and the storage strip 50. The smooth outer surfaces of this envelope help prevent the transparency assembly 10 from snagging or tearing when the transparency assembly 10 is fed into an imaging device, such as a xerographic machine, a laser printer, an ink jet printer, or other printing devices known in the art.

In the manufacturing position (illustrated in FIGS. 2B and 3B), the joints for the hinges of the transparency assembly 10 are exposed, thus allowing placement of the longitudinal tape hinges to couple the elements of the present invention.

In the storage configuration (FIGS. 2D, 3D, 6 and 7), the protective sheet 30 is placed in the first folded position, superimposed over the imaging area 26 of the first major surface 22 of imageable sheet 20. The imaging area 26 is protected from dirt, scratches, spills, or other actions that may potentially damage the image. In other embodiments, the protective sheet may include a material that may accept writing, such as from an overhead marking pen, to allow for notes or comments to be placed on the protective sheet without affecting the underlying imageable sheet. In the storage configuration, the flaps 40 remain in the folded position. Rotation of the protective sheet 30 about the full rotation hinge 60 causes the storage strip 50 to unfold and extend laterally outwards, allowing the transparency assembly 10 to be placed in a storage binder or other storage device.

In the display or use configuration (FIGS. 2C, 3C, 8 and 9), the flaps 40 extend to their unfolded position. In the unfolded position, the flaps 40 and 42 may be used to block, scatter, color or pattern peripheral light as well as to provide framing edges for the imageable sheet 20 as discussed above. To reach the unfolded position, the flaps 40 and 42 rotate about an axis proximal to the longitudinal edges 28a and 28c and reach a position that is essentially coplanar with the imageable sheet 20 and the protective sheet 30. The protective sheet 30 remains overlaid above the imageable sheet 20, protecting the imaging area 26. If desired, the protective sheet 30 alternatively may be turned to an intermediate unfolded position alongside the imageable sheet 20.

Figure 10:
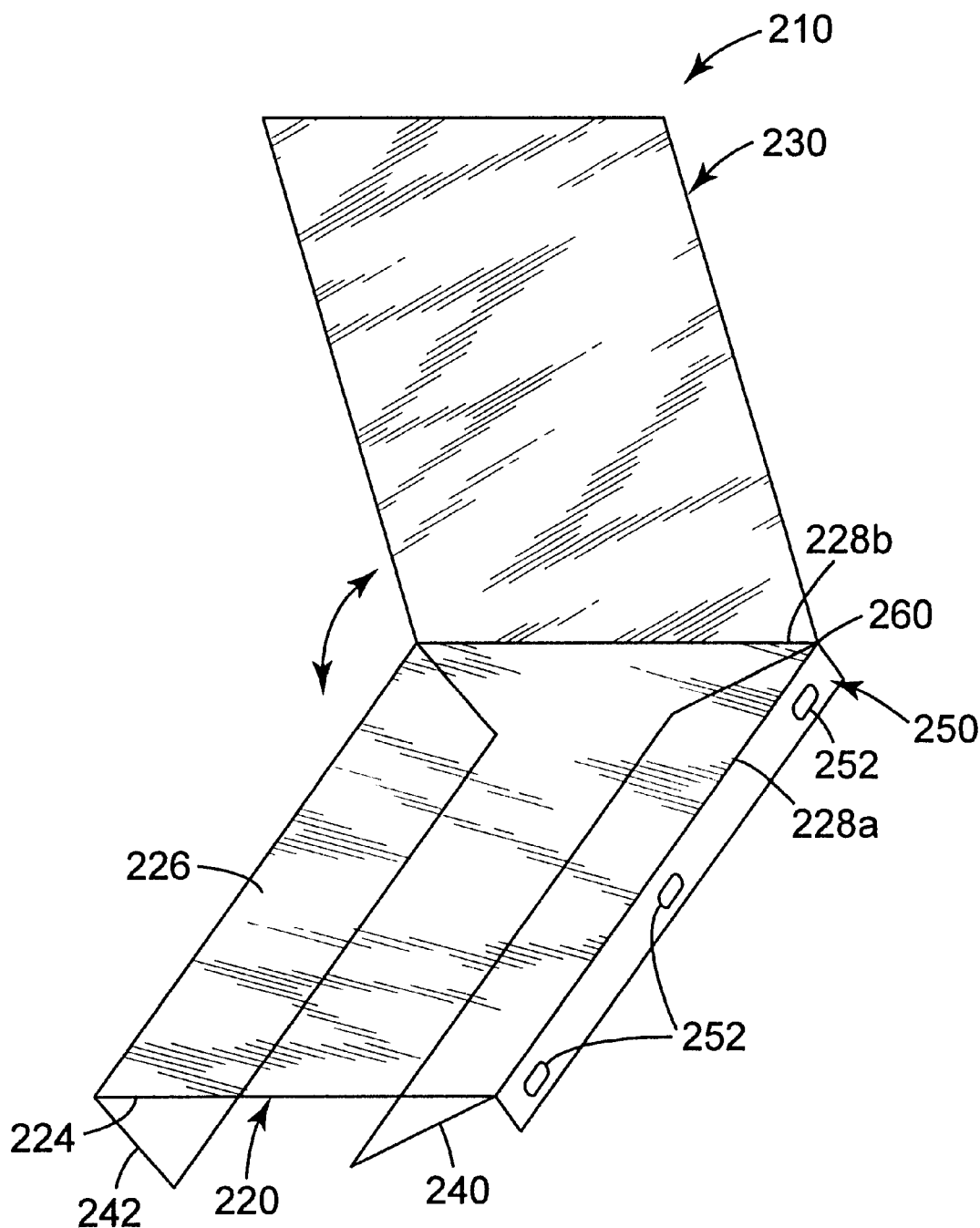
FIG. 10 is a top perspective view of a second transparency assembly in accordance with the present invention.

FIG. 10 illustrates a transparency assembly 210, an alternative second embodiment of the present invention. In the alternative embodiments depicted in FIGS. 10–14 elements similar to those of the transparency assembly 10 have reference numbers having the same last two numerals as those of the elements in transparency assembly 10. In the transparency assembly 210, a protective sheet 230 is hingedly coupled by a full rotation hinge 260 to a lateral side edge 228b of an imageable sheet 220. In the storage and display mode, the protective sheet 230 is rotated about the lateral side edge 228b to overlay the imaging area 226 of the imageable sheet 220. For the imaging configuration, the protective sheet 230 is rotated 360° about an axis generally disposed at the lateral side edge 228b, and placed against a back surface 224 of the imageable sheet 220. Flaps or framing strips 240 and 242 are hingedly coupled to or close to the longitudinal side edges 228a and 228c of the imageable sheet 220. A storage strip 250 having perforations 252 is coupled generally to a longitudinal side edge 228A of the imageable sheet 220. In the imaging mode, the flaps 240 and 242, and if desired the storage strip 250, are folded against the second major surface 224 of the imageable sheet 220 and the protective sheet 230 is rotated against them to form an enclosed envelope configuration.

Figure 11:
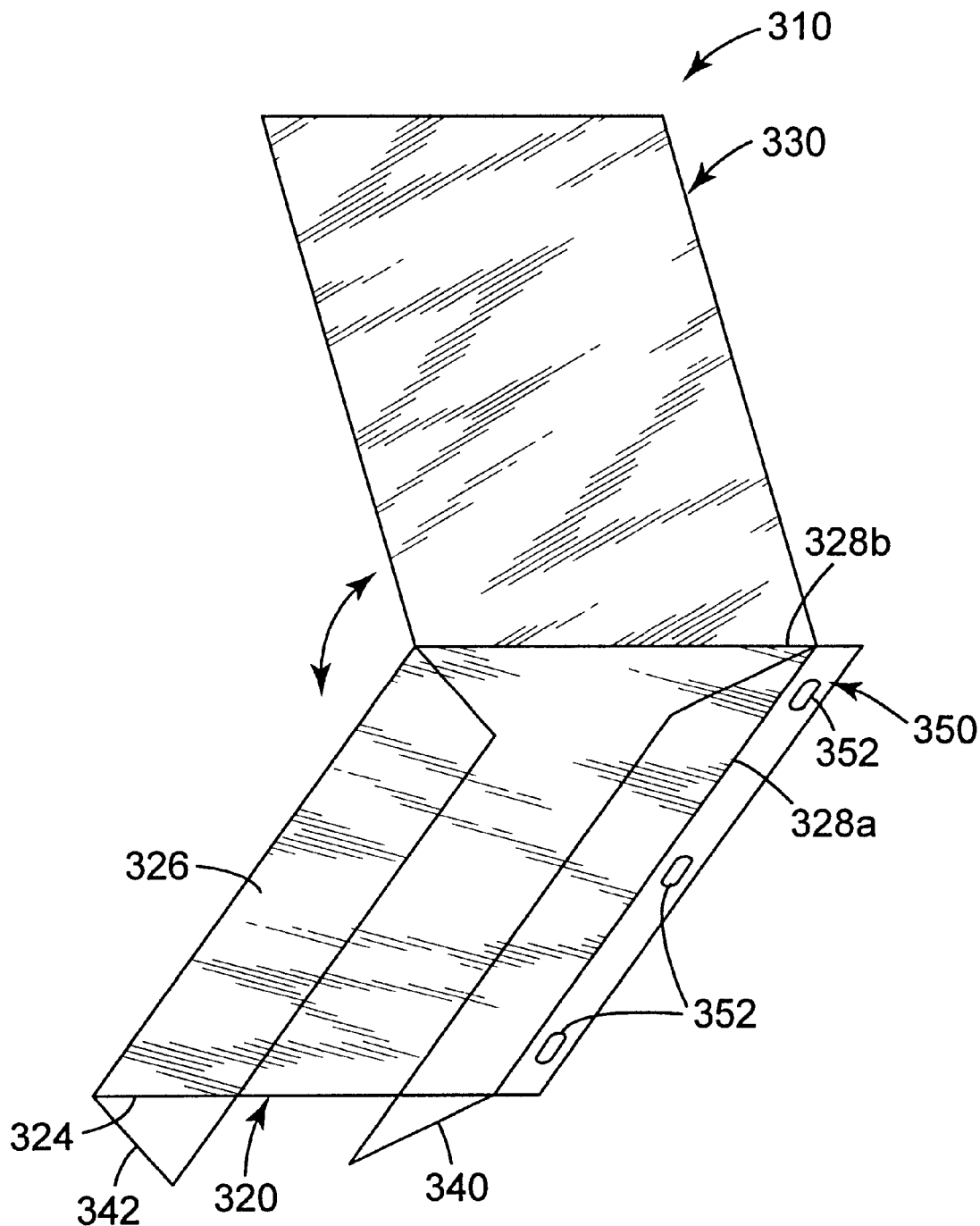
FIG. 11 is a top perspective view of a third transparency assembly in accordance with the present invention.

FIG. 11 illustrates an alternative third embodiment, transparency assembly 310, including a storage strip 350 rigidly attached to a longitudinal side edge 328A of an imageable sheet 320. A protective sheet 330 is hingedly coupled proximally to a lateral side edge 328B. In a storage configuration, the protective sheet 330 rests over a top surface 322 of the imageable sheet 320. In the imaging configuration, the protective sheet 330 may be flipped behind the imageable sheet 320 exposing the imaging area 326. The flaps 340 and 342 remain in the folded position between the protective sheet 330 and the imageable sheet 320. The enclosed imaging configuration helps facilitate passage through an imaging device and helps prevent tears or snags. In the exemplary transparency assembly 310, the width of the imaging area 326, the imageable sheet 320 and the protective sheet 330 have been reduced to allow the passage of the transparency assembly 310 having the rigid storage strip 350 through conventional imaging devices.

Figure 12:
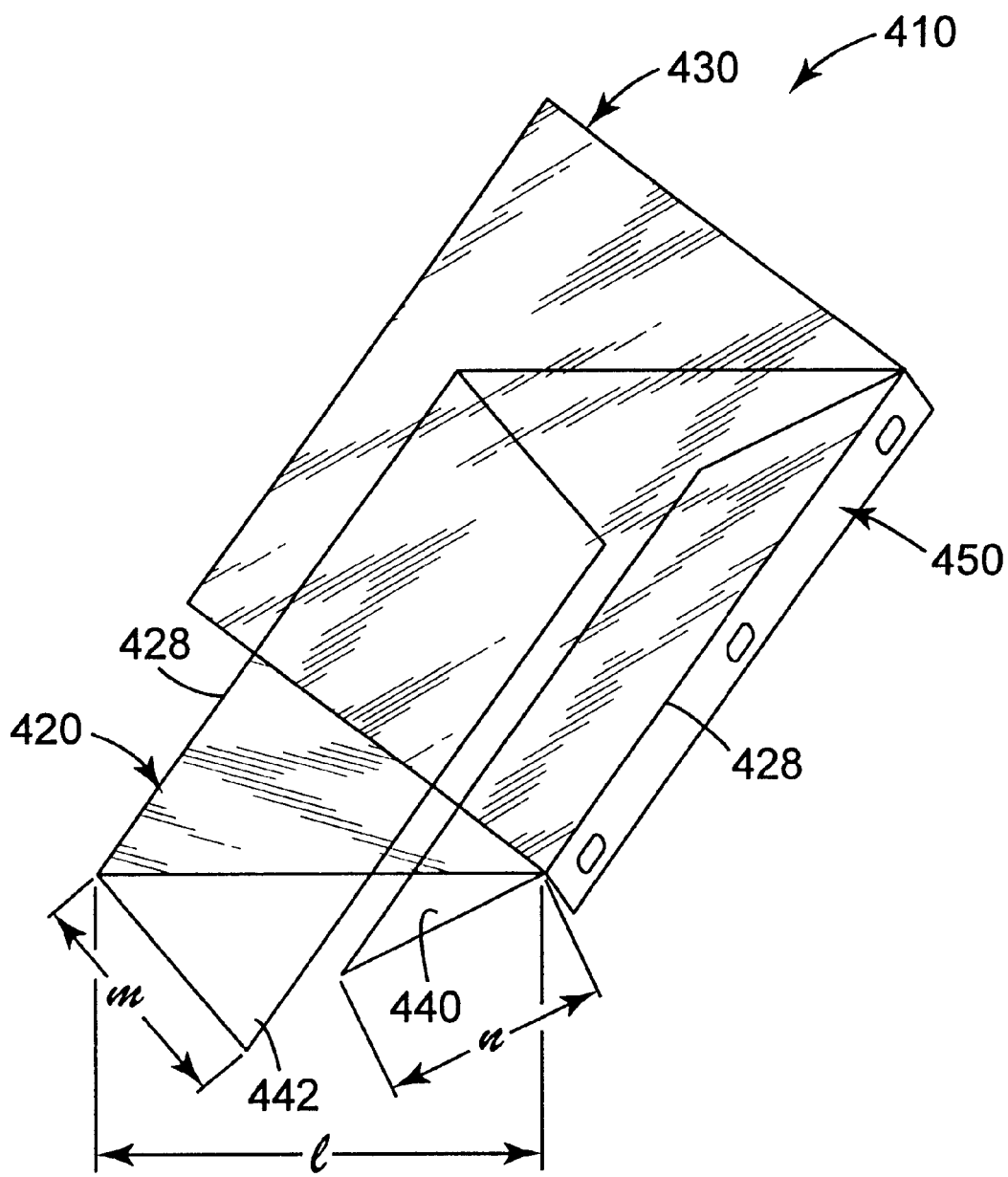
FIG. 12 is a top perspective view of a fourth transparency assembly in accordance with the present invention.

FIG. 12 illustrates an alternative fourth embodiment, transparency assembly 410, in accordance with the present invention. The transparency assembly 410 includes two flaps 440 and 442 hingedly coupled to the general region generally along longitudinal edges 428 of an imageable sheet 420. The flaps 440 and 442 abut against each other in the folded position to completely cover a back surface 424 of the imageable sheet 420. That is, where the width of flaps 420 is defined as m and n and the width of the imageable sheet 420 is defined as l, then m+n≧.l. When opaque flaps are used, the present embodiment allows the presenter to preview the image against an opaque background.

Figure 13:
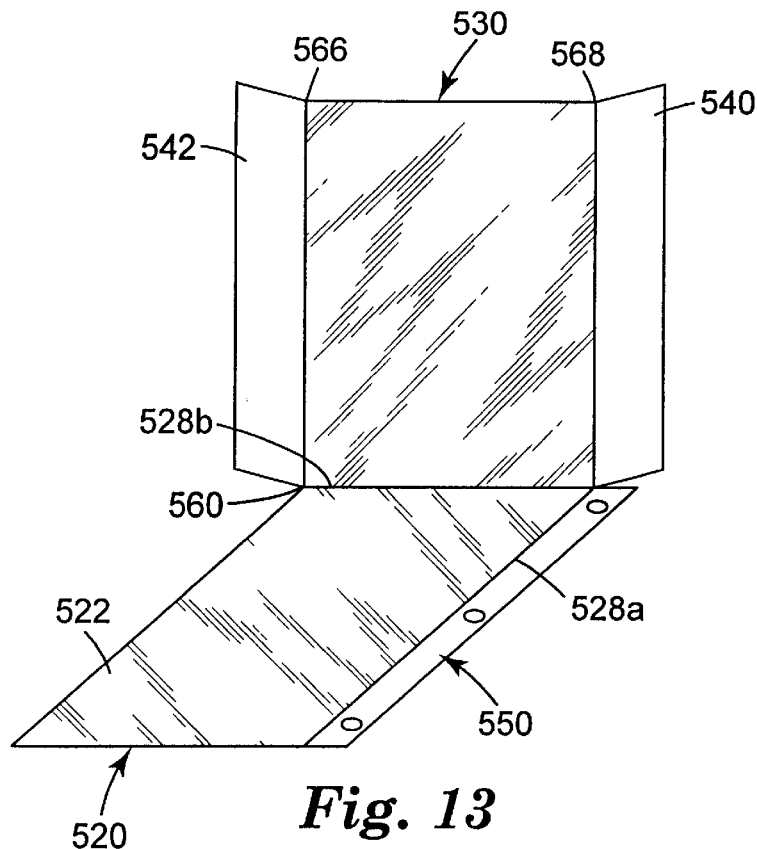
FIG. 13 is a top perspective view of a fifth transparency assembly in accordance with the present invention.

A fifth alternative embodiment of a transparency assembly in accordance with the present invention is illustrated in FIG. 13. The transparency assembly 510 includes an imageable sheet 520 hingedly coupled to a protective sheet 530. Two flaps 540 and 542 are coupled by flat 180° hinges 563 to the protective sheet 530. The flaps 540 and 542 have a folded position covering the protective sheet 530. The transparency assembly 510 has a display mode where the flaps 540 and 542 extend to an unfolded position while the protective sheet 530 rests over a top surface 522 of the imageable sheet 520. The hinges 563 include a 180° hinge comprising a strip of adhesive tape which allows the flap 540 to lay flat in the unfolded position generally alongside the protective sheet 530. The protective sheet 530 includes a full rotation hinge 560 that allows the protective sheet 530 to be flipped about the imageable sheet 520 into an imaging mode. In the imaging mode, the flaps 540 and 542 are layered between the protective sheet 530 and the imageable sheet 520 and a top surface 522 of the imageable sheet 520 is exposed. In a storage mode, the protective sheet 530 and the flaps 540 cover the top surface 522 of the imageable sheet 520.

Figure 14:
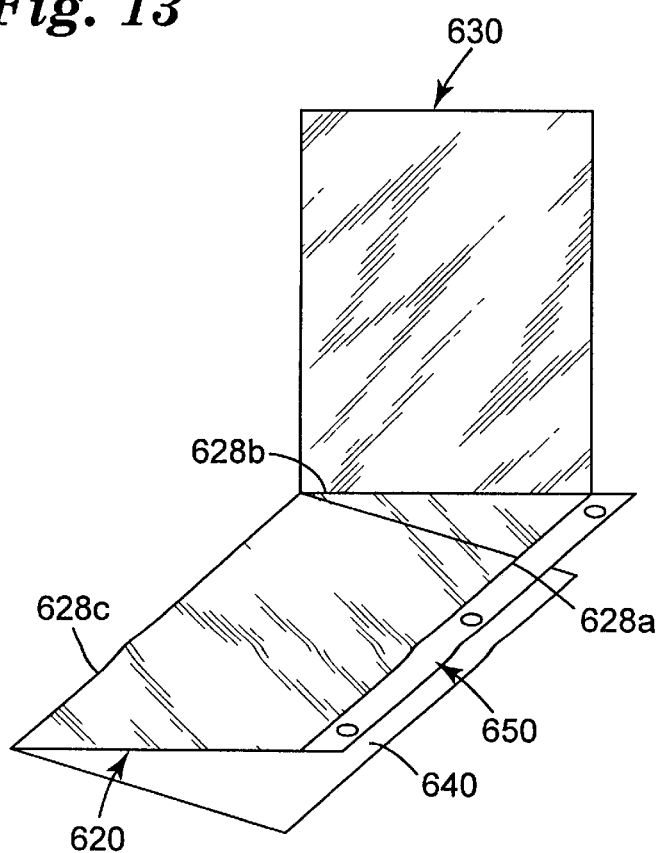
FIG. 14 is a top perspective view of a sixth transparency assembly in accordance with the present invention.

FIG. 14 illustrates a transparency assembly 610, a sixth alternative embodiment of the present invention. A protective sheet 630 is hingedly coupled to a lateral side edge 628b of an imageable sheet 620. The transparency assembly 610 included a single opaque flap 640 attached in a foldable manner along one of the longitudinal side edges 628a of an imageable sheet 620. The flap 640 is attached to and spaced a distance from the longitudinal edge 628a such that in the unfolded position the flap 640 extends beyond and covers the longitudinal edge 628. In the folded position, the flap 640 exposes the longitudinal side edge 628. The flap 640 is formed of a plastic material which accepts written text by conventional writing instruments. A storage strip 650 is attached to the longitudinal edge 628 of the imageable sheet 620. The flap 640 is coupled to a same hinge 663 as the storage strip 650. In a display mode, the flap 640 folds generally alongside the imageable sheet 628 and blocks peripheral light while covering the storage strip 650.

The present invention offers a transparency assembly having built-in protection, storage and presentation features. The transparency assembly may be used in conventional printing devices and reduces the manual labor involved in mounting a transparency in traditional sleeves, envelopes or frames. The transparency assembly also reduces oil pooling effects present in traditional transparency sleeves.

While the present invention has been described with a reference to exemplary preferred embodiments, the invention may be embodied in other specific forms without departing from the spirit of the invention. Accordingly, it should be understood that the embodiments described and illustrated herein are only exemplary and should not be considered as limiting the scope of the present invention. Other variations and modifications may be made in accordance with the spirit and scope of the present invention.

What is claimed is:

1. A transparency assembly comprising:
 a) a full rotational hinge;
 b) a transparent imageable sheet having a first major surface, a second major surface, and a plurality of side edges; and
 c) a protective sheet, wherein the hinge hingedly couples the protective sheet to the imageable sheet in a foldable manner, the protective sheet having a first folded position where the protective sheet overlays at least a portion of the first major surface of the imageable sheet and a second folded position where the protective sheet overlays at least a portion of the second major surface of the imageable sheet, further comprising a flap hingedly coupled to one of the sheets, the flap having a folded position and an unfolded position, wherein the folded position, the flap overlays at least a portion of the imageable sheet, further comprising a second flap, the imageable sheet having two opposite side edges and wherein the flaps each are hingedly coupled proximally to one of the opposite side edges.

2. The transparency assembly of claim 1, wherein said flaps substantially abut each other when in the folded position.

3. A transparency assembly comprising:
 a) a full rotational hinge;
 b) a transparent imageable sheet having a first major surface, a second major surface, and a plurality of side edges; and a protective sheet, wherein the hinge hingedly couples the protective sheet to the imageable sheet in a foldable manner, the protective sheet having a first folded position where the protective sheet overlays at least a portion of the first major surface of the imageable sheet and a second folded position where the protective sheet overlays at least a portion of the second major surface of the imageable sheet, further comprising a flap hingedly coupled to one of the sheets, the flap having a folded position and an unfolded position, where in the folded position, the flap overlays at least a portion of the imageable sheet, wherein the second folded position of the protective sheet and the imageable sheet form a relatively smooth outer envelope enclosing the flap.

4. A transparency assembly comprising:
 a) a full rotational hinge;
 b) a transparent imageable sheet having a first major surface, a second major surface, and a plurality of side edges; and
 c) a protective sheet, wherein the hinge hingedly couples the protective sheet to the imageable sheet in a foldable manner, the protective sheet having a first folded position where the protective sheet overlays at least a portion of the first major surface of the imageable sheet and a second folded position where the protective sheet overlays at least a portion of the second major surface of the imageable sheet, further comprising a storage strip generally coupled to a side edge of the imageable sheet wherein the second folded position of the protective sheet said storage strip is pleated under said protective sheet.

5. A transparency assembly comprising:

a) a full rotational hinge;

b) a transparent imageable sheet having a first major surface, a second major surface, and a plurality of side edges;

c) and a protective sheet, wherein the hinge hingedly couples the protective sheet to the imageable sheet in a foldable manner, the protective sheet having a first folded position where the protective sheet overlays at least a portion of the first major surface of the imageable sheet and a second folded position where the protective sheet overlays at least a portion of the second major surface of the imageable sheet, further comprising a flap hingedly coupled to one of the sheets, the flap having a folded position and an unfolded position, where in the folded position, the flap overlays at least a portion of the imageable sheet, wherein the full rotational hinge comprises a longitudinal strip of adhesive tape coupling side regions of the imageable sheet, the protective sheet, and the flap.

6. A transparency assembly comprising:

a) a generally rectangular transparent imageable sheet having two opposite longitudinal side edges and two opposite lateral side edges, the imageable sheet further including i) a sheet of a transparent material having a first and a second major surfaces, and ii) an imaging coating capable of accepting an image covering at least a portion of the first major surface of the sheet of transparent material and defining an imaging area;

b) a full rotational hinge;

c) a transparent protective sheet, wherein the rotational hinge hingedly couples the protective sheet to one of the side edges of the imageable sheet in a foldable manner, the transparent protective sheet having a first folded position wherein the protective sheet covers at least a portion of the imaging area; and d) two framing strips, each framing strip hingedly coupled proximal to one of the side edges of one of the transparent sheets, the framing strips having a folded position overlaying at least a portion of the imageable sheet.

7. The transparency assembly of claim 6, wherein the protective sheet has a second folded position wherein the protective sheet covers at least a portion of the second major surface of the imageable sheet and the protective sheet and the imageable sheet enclose the framing strips.

8. The transparency assembly of claim 6, further comprising a storage strip generally coupled to one of the longitudinal side edges of the imageable sheet.

9. The transparency assembly of claim 6, the framing strips including a generally opaque material.

10. The transparency assembly of claim 6, wherein said imageable sheet is imageable by a printing device and said transparency assembly is capable of passage through said device.

11. The transparency assembly of claim 6, wherein the rotational hinge hingedly couples the protective sheet to a lateral side edge of the imageable sheet.

12. The transparency assembly of claim 6, further comprising framing strip hinges coupling the framing strips to the protective sheet.

13. The transparency assembly of claim 6, wherein the framing strips have a first folded position substantially covering the entire back of the imaging area.

14. The transparency assembly of claim 7 having an imaging position wherein the flaps are in a folded position and the protective sheet is in the second folded position, a use position wherein the flaps are in an unfolded position, and a storage position wherein the protective sheet is in the first folded position.

* * * * *